US012671287B2

(12) United States Patent
Riggs et al.

(10) Patent No.: US 12,671,287 B2
(45) Date of Patent: Jun. 30, 2026

(54) INTERNALLY COOLED MAGNETIC ROTOR FOR HEATING A SUBSTRATE

(71) Applicant: Novelis Inc., Atlanta, GA (US)

(72) Inventors: James Charles Riggs, Acworth, GA (US); Rodger Eugene Brown, Atlanta, GA (US); Antoine Jean Willy Pralong, Granges (CH); Jacob Whelchel, Decatur, GA (US)

(73) Assignee: Novelis Inc., Atlanta, GA (US)

( * ) Notice: Subject to any disclaimer, the term of this patent is extended or adjusted under 35 U.S.C. 154(b) by 76 days.

(21) Appl. No.: 17/758,635

(22) PCT Filed: Jan. 8, 2021

(86) PCT No.: PCT/US2021/012713
§ 371 (c)(1),
(2) Date: Jul. 12, 2022

(87) PCT Pub. No.: WO2021/146114
PCT Pub. Date: Jul. 22, 2021

(65) Prior Publication Data
US 2023/0041403 A1 Feb. 9, 2023

Related U.S. Application Data

(60) Provisional application No. 62/961,331, filed on Jan. 15, 2020.

(51) Int. Cl.
*H02K 1/32* (2006.01)
*H02K 1/278* (2022.01)
(Continued)

(52) U.S. Cl.
CPC .............. *H02K 1/32* (2013.01); *H02K 1/278* (2013.01); *H02K 7/003* (2013.01); *H02K 9/193* (2013.01); *H05B 6/109* (2013.01)

(58) Field of Classification Search
CPC .......... H02K 1/32; H02K 1/278; H02K 7/003; H02K 9/193; H02K 2205/09; H05B 6/109
See application file for complete search history.

(56) References Cited

U.S. PATENT DOCUMENTS 6,725,683 B1 * 4/2004 Laskaris ............... F25B 23/006
165/104.21
8,022,582 B2 9/2011 Dames et al.
(Continued)

FOREIGN PATENT DOCUMENTS

| CN | 110048566 A | 7/2019 |
| DE | 102011052085 | 1/2013 |
(Continued)

OTHER PUBLICATIONS

English translation of JP-2013-055799-A (Year: 2013).*
(Continued)

*Primary Examiner* — Tulsidas C Patel
*Assistant Examiner* — Joshua M Rodriguez
(74) *Attorney, Agent, or Firm* — Kilpatrick Townsend & Stockton LLP

(57) ABSTRACT

Disclosed are magnetic rotors systems and methods for heating a substrate. The magnetic rotor includes a rotor body and at least one magnet supported on the rotor body. The rotor body is rotatable about an axis. The rotor body also defines a chamber that selectively receives a coolant within the chamber.

10 Claims, 5 Drawing Sheets

(51) Int. Cl.
 H02K 7/00 (2006.01)
 H02K 9/193 (2006.01)
 H05B 6/10 (2006.01)

(56) References Cited

U.S. PATENT DOCUMENTS

| | | | |
|---|---|---|---|
| 8,296,927 B2 | 10/2012 | Baumann et al. | |
| 2010/0164310 A1 | 7/2010 | Dames et al. | |
| 2013/0093271 A1* | 4/2013 | Luke ........................ | H02K 7/10 |
| | | | 310/58 |
| 2019/0074742 A1* | 3/2019 | Matsumoto .............. | H02K 9/19 |
| 2020/0076257 A1* | 3/2020 | Piazza Galarza ........ | H02K 7/14 |

FOREIGN PATENT DOCUMENTS

| | | | | |
|---|---|---|---|---|
| DE | 102015223462 A1 * | 6/2017 | .............. | H02K 1/32 |
| DE | 102017124471 | 11/2017 | | |
| EP | 2854259 | 4/2015 | | |
| EP | 3687038 | 7/2020 | | |
| JP | 05276711 A | 10/1993 | | |
| JP | 1086474 A | 4/1998 | | |
| JP | 2012044753 A | 3/2012 | | |
| JP | 2013055799 A | 3/2013 | | |
| JP | 2013258889 A | 12/2013 | | |
| JP | 2016149898 A | 8/2016 | | |
| JP | 2019047644 A | 3/2019 | | |
| JP | 2019518408 A | 6/2019 | | |
| JP | 2020504278 A | 2/2020 | | |
| TW | 201330466 | 7/2013 | | |
| WO | 2018064138 A1 | 4/2018 | | |

OTHER PUBLICATIONS

English translation of JP-H05-276711-A (Year: 1993).*
English translation of DE-102015223462-A1 (Year: 2017).*
EP Application No. 21705673.8, "Intention to Grant", Jul. 18, 2023, 9 pages.
IN Application No. 202217043209, "First Examination Report", Feb. 1, 2023, 7 pages.
JP Application No. 2022-543180, "Office Action", Aug. 29, 2023, 10 pages.
International Application No. PCT/US2021/012713 , International Search Report and Written Opinion, Mailed On Apr. 22, 2021, 13 pages.
Indian Application No. 202217043209 , "First Examination Report", mailed on Feb. 1, 2023, 7 pages.
CA Application No. 3,167,931 , "Office Action", Oct. 13, 2023, 5 pages.
KR Application No. 10-2022-7026242 , "Office Action", Nov. 10, 2023, 16 pages.
KR Application No. 10-2022-7026242 , "Notice of Decision to Grant", Jul. 27, 2024, 6 pages.
JP Application No. 2022-543180, "Office Action", Feb. 6, 2024, 11 pages.
JP Application No. 2022-543180 , "Office Action", Oct. 29, 2024, 15 pages.
MX Application No. MX/A/2022/008730 , "Office Action", Apr. 1, 2025, 3 pages.
CA Application No. 3,167,931, "Notice of Allowance", Jun. 30, 2025, 1 page.
CN Application No. 202180021183.3, "Office Action", Jun. 19, 2025, 9 pages.
MX Application No. MX/A/2022/008730, "Notice of Allowance", May 22, 2025, 3 pages.
Brazilian Patent Application No. BR112022013988-8, "Office Action", Feb. 9, 2026, 7 pages.

* cited by examiner

INTERNALLY COOLED MAGNETIC ROTOR FOR HEATING A SUBSTRATE

CROSS-REFERENCE TO RELATED APPLICATIONS

This application is a U.S. national phase under 35 U.S.C. § of International Patent Application No. PCT/US2021/012713, filed Jan. 8, 2021 and entitled INTERNALLY COOLED MAGNETIC ROTOR FOR HEATING A SUBSTRATE, which claims the benefit of U.S. Provisional Patent Application No. 62/961,331, filed on Jan. 15, 2020 and entitled INTERNALLY COOLED MAGNETIC ROTOR FOR HEATING A SUBSTRATE, the content of which are hereby incorporated by reference in their entirety.

FIELD OF THE INVENTION

This application relates to substrate processing, such as metal processing, generally, and, more specifically, to magnetic rotors for heating a substrate.

BACKGROUND

In substrate processing, such as metal processing, it can be desirable to control the temperature of the substrate before, during, or after various processing steps. For example, it can be desirable to heat a metal strip prior to performing certain processes and/or it can be desirable to maintain heat in a metal strip for a duration of time without allowing the metal strip to cool below a minimum temperature. Temperature control can generally involve adding or removing heat energy to or from the substrate.

One technique for adding heat energy to a substrate includes the use of a magnetic rotor with permanent magnets. The magnetic rotor rotates about an axis to induce a magnetic field into the substrate to heat the substrate. A problem with such rotors is that during use, the magnets generate a large amount of heat that negatively affects the field strength and efficiency, increases the possibility of demagnetization, and reduces the useable life of the magnetic rotor.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a magnetic rotor includes a rotor body and at least one magnet supported on the rotor body. The rotor body is rotatable about an axis, and the rotor body defines a chamber having an inlet and an outlet. The rotor body defines a coolant flow path within the chamber from the inlet to the outlet, and the rotor body is configured to receive a coolant within the chamber.

According to some embodiments, a magnetic rotor system includes a magnetic rotor and a coolant supply. The magnetic rotor includes a rotor body that is rotatable about an axis, and the rotor body defines a chamber. The magnetic rotor also includes at least one magnet supported on the rotor body. The coolant supply is in fluid communication with the magnetic rotor such that a coolant is selectively provided into the chamber of the rotor body.

According to various embodiments, a magnetic rotor includes a rotor body and at least one magnet supported on the rotor body. The rotor body is rotatable about an axis, and the rotor body defines a chamber configured to receive a coolant within the chamber.

According to certain embodiments, a magnetic rotor includes a rotor body having an outer surface. The rotor body also defines a chamber that is configured to receive a coolant within the chamber. The chamber extends beneath at least a portion of the outer surface, and at least one magnet is supported on the outer surface of the rotor body.

According to some embodiments, a method of controlling a temperature of a magnetic rotor of a magnetic rotor system includes providing a magnetic rotor having a rotor body and at least one magnet supported on the rotor body. The rotor body defines a chamber having an inlet and an outlet. The method also includes supplying a coolant to the magnetic rotor such that the coolant flows through the chamber from the inlet to the outlet.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

Described herein are systems and methods for heating a substrate. In some examples, the substrate may be a metal substrate (e.g., a metal sheet or a metal allow sheet) or a non-metal substrate. For example, the substrate may include aluminum, aluminum alloys, steel, steel-based materials, magnesium, magnesium-based materials, copper, copper-based materials, composites, sheets used in composites, or any other suitable metal, non-metal, or combination of materials. Thus, although the following description is provided with reference to a metal substrate, the description is applicable to various other types of metal or non-metal substrates.

In some cases, described herein are magnetic rotors for heating a substrate and that are internally cooled. In various aspects, because the magnetic rotors are internally cooled, they may be used for heating thicker substrates (e.g., thicker aluminum strips) compared to traditional rotors, may operate closer to the substrate, may operate at higher rotational speed, may heat substrates with higher electrically conductive properties, and/or may heat other non-ferrous conductive metals. In various aspects, internally cooling the magnetic rotors removes heat from the magnets of the magnetic rotor during use, which may ensure or improve magnetic field strength and efficiency of the magnetic rotor in heating applications. Internally cooling the magnetic rotors may also reduce the possibility of demagnetization and/or increase the usable life of the magnetic rotors because it is not prematurely demagnetized due to overheating. In various examples, the magnetic rotors are internally cooled such that a predetermined amount of heat is removed from the rotors during use. Magnetic rotors that are internally cooled may also be controlled such that the magnetic rotors have a desired temperature gradient along a length of the rotors.

Figure 1:
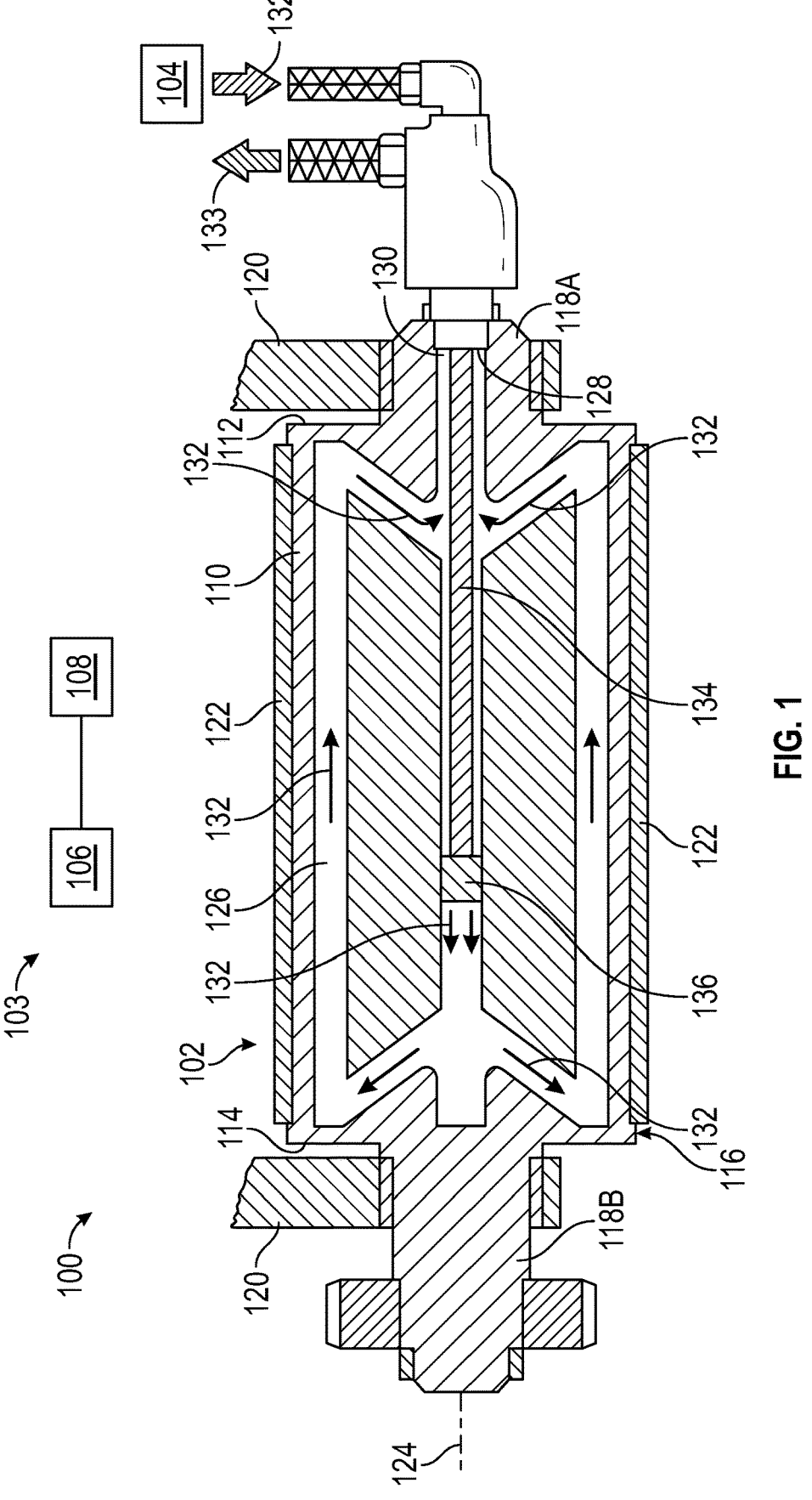
FIG. 1 is a schematic of a magnetic rotor system according to embodiments of the disclosure.

FIG. 1 illustrates an example of a magnetic rotor system 100 according to various embodiments. As illustrated in FIG. 1, the magnetic rotor system 100 includes at least one magnetic rotor 102. Depending on a desired use of the magnetic rotor system 100, any number of magnetic rotors 102 in any suitable arrangement may be utilized. In addition to the magnetic rotor 102, the magnetic rotor system 100 may include a coolant supply 104, optionally at least one sensor 106, and optionally at least one controller 108.

The magnetic rotor 102 includes a rotor body 110 that has a first end 112, a second end 114 opposite from the first end 112, and an outer surface 116 between the first end 112 and the second end 114. The magnetic rotor 102 has an axis 124, and the outer surface 116 may generally be parallel to the axis 124. Support structures 118A-B support the magnetic rotor 102 on a support 120. The support structures 118A-B may be integrally formed with the rotor body 110, or they may be separate components from the rotor body 110. In the example of FIG. 1, the support structures 118A-B extend from the first end 112 and the second end 114, respectively. The support structures 118A-B should not be considered limiting.

At least one magnet 122 is supported on the rotor body 110. In the example of FIG. 1, two magnets 122 are illustrated on the rotor body 110, although in other examples, a single magnet or a plurality of magnets may be supported on the rotor body. In certain examples, the magnet 122 is supported on the outer surface 116 of the rotor body 110, although it need not be in other examples. Each magnet 122 may be any suitable type of magnet, such as a permanent magnet, an electromagnet, or an electro-permanent magnet. In the example of FIG. 1, the magnets 122 are permanent magnets. Optionally, a shell (not illustrated) may at least partially cover the magnet 122 (i.e., the magnet 122 is between the shell and the rotor body 110).

In addition to the outer surface 116, the rotor body 110 defines a chamber 126 that selectively receives a coolant to control the temperature of the magnetic rotor 102. In certain examples, the chamber 126 extends at least partially beneath the portion of the rotor body 110 that is supporting the magnets 122. In the example of FIG. 1, the chamber 126 extends at least partially beneath the outer surface 116 of the rotor body 110. The chamber 126 may have various sizes, shapes, configurations, etc. as desired to control various characteristics of the magnetic rotor system 100. Such characteristics may include, but are not limited to, the volume of coolant within the rotor body 110, the flow rate of the coolant through the chamber 126, the flow path of the coolant through the chamber 126, a pressure of the coolant within the chamber 126, etc. For example, FIGS. 2-5 illustrate magnetic rotors with chambers that are different from that of FIG. 1. As such, the particular chamber 126 illustrated in FIG. 1 should not be considered limiting.

The chamber 126 has an inlet 128 and an outlet 130, and a flow path (represented by arrows 132) is defined between the inlet 128 and the outlet 130. In some examples, the inlet 128 and the outlet 130 are at the same side of the rotor body 110. For example, in FIG. 1, the inlet 128 and outlet 130 are both at the first end 112 of the rotor body 110. However, in other examples, the inlet 128 and outlet 130 need not be at the same side. For example, in FIG. 4 and as discussed in detail below, the inlet 128 is at the first end 112 and the outlet 130 is at the second end 114 (or vice versa).

The inlet 128 is in fluid communication with the coolant supply 104. In some examples, the outlet 130 is also in fluid communication with the coolant supply 104, although it need not be. The coolant supply 104 may be a tank or other suitable device, system, or structure that can selectively supply coolant to the magnetic rotor 102. In some optional examples, the coolant supply 104 may be at least one tank, and the at least one tank may be supported at a position vertically above the magnetic rotor 102 such that the chamber 126 is always filled with the coolant due to gravity. The coolant may be any suitable cooling agent or cooling medium capable of sufficiently removing heat from the magnetic rotor 102 to generate the desired cooling. For example, the coolant may be water, deionized water, an emulsion containing water, a mechanical dispersion containing water, a low-boiling temperature fluid, oil, a gas, or various other suitable coolants. From the outlet 130, the coolant exits the magnetic rotor 102 (represented by arrow 133 in FIG. 1). The coolant exiting the magnetic rotor 102 may have an increased temperature compared to a temperature of the coolant when it initially enters the magnetic rotor 102 and/or the chamber 126. In some examples, the coolant may optionally be returned to the coolant supply 104 for subsequent cooling and recirculation back through the magnetic rotor 102.

The magnetic rotor 102 is rotatable about the axis 124. In some examples, when the magnetic rotor 102 is used for heating a metal substrate such as a metal strip, the axis 124 may be substantially perpendicular to a longitudinal axis of the metal strip passing adjacent to the magnetic rotor 102. In other words, the axis 124 of rotation is perpendicular a processing direction (e.g., a rolling direction) of the metal strip. The rotational movement of the magnetic rotor 102 causes the magnet 122(s) to induce a moving or changing magnetic field. The magnetic rotor 102 can be rotated through any suitable method, including through a rotor motor (e.g., electric motor, pneumatic motor, or otherwise) or sympathetic movement of a nearby magnetic source (e.g., another magnetic rotor).

In various examples, the coolant is supplied to the chamber 126 while the magnetic rotor 102 rotates such that the coolant removes heat from the magnetic rotor 102. In some examples, the coolant is supplied to the magnetic rotor 102 with a predetermined characteristic that corresponds with a particular amount of heat to be removed from the magnetic rotor 102. The at least one characteristic may include, but is not limited to, a type of coolant, a flow rate, an entry and/or exit pressure, a temperature of the coolant when it enters the chamber 126, a temperature of the coolant when it exits the chamber 126, combinations thereof, or other suitable characteristics or combinations of characteristics. In some examples, the coolant is supplied such that about 10 kW per meter of width of heat is removed from the magnetic rotor 102, although in other examples, the coolant may be supplied such that less heat or more heat is removed as desired. In some optional examples, a maximum allowable permanent magnet temperature may be less than or equal to about 80° C. In such examples, the magnet temperature may be directly measured using various suitable sensors, indirectly measured, or determined through various suitable calculations based on characteristics of the system. In various examples, the coolant is supplied such that the magnetic rotor 102 has a desired temperature gradient along the length of the magnetic rotor 102. In certain aspects, the coolant is provided to minimize the temperature gradient along the length of the magnetic rotor 102.

In some optional examples, the magnetic rotor 102 includes a supply extension 134 within the chamber 126. The supply extension 134 may be in fluid communication with the inlet 128 and may initially supply the coolant within the chamber 126 at a location that is offset from the inlet 128. As one non-limiting example, in FIG. 1, the inlet 128 is at the first end 112, and the supply extension 134 is in fluid communication with the inlet 128 such that the coolant is initially supplied within the chamber 126 at a location 136 that is more proximate to the second end 114 than to the first end 112. In other examples, the location 136 may be various other locations within the chamber 126 that are offset from the inlet 128.

Optionally, the magnetic rotor system 100 includes a control system 103 that includes at least one sensor 106 and the at least one controller 108. The sensor 106 may detect at least one characteristic of the magnetic rotor system 100, and the controller 108 may control the magnetic rotor system 100 based on the detected characteristic. In some examples, at least one characteristic is directly related to or indirectly related to the heat removed from the magnetic rotor 102 by the coolant. For example, at least one characteristic detectable by the sensor 106 may include, but is not limited to, a temperature gradient of the magnetic rotor, a temperature gradient of the coolant within the chamber, a temperature of the coolant exiting the magnetic rotor, a pressure of the coolant, or a flow rate of the coolant, combinations thereof, or other suitable characteristics. As such, the sensor 106 may be various suitable types of sensors for detecting at least one characteristic of the magnetic rotor system 100.

The controller 108 is communicatively coupled to the sensor 106 and receives the detected characteristic from the sensor 106. In some examples, based on the detected characteristic (e.g., by comparing the detected characteristic to a predetermined characteristic), the controller 108 may control the magnetic rotor system 100 (e.g., such that the detected characteristic matches the predetermined characteristic). As some non-limiting examples, controlling the magnetic rotor system 100 may include, but is not limited to, adjusting the entry and/or exit pressure of the coolant, adjusting the temperature of the coolant supplied to the magnetic rotor and/or at the exit of the magnetic rotor, adjusting the flow rate of the coolant, combinations thereof, or various other controls.

Figure 2:
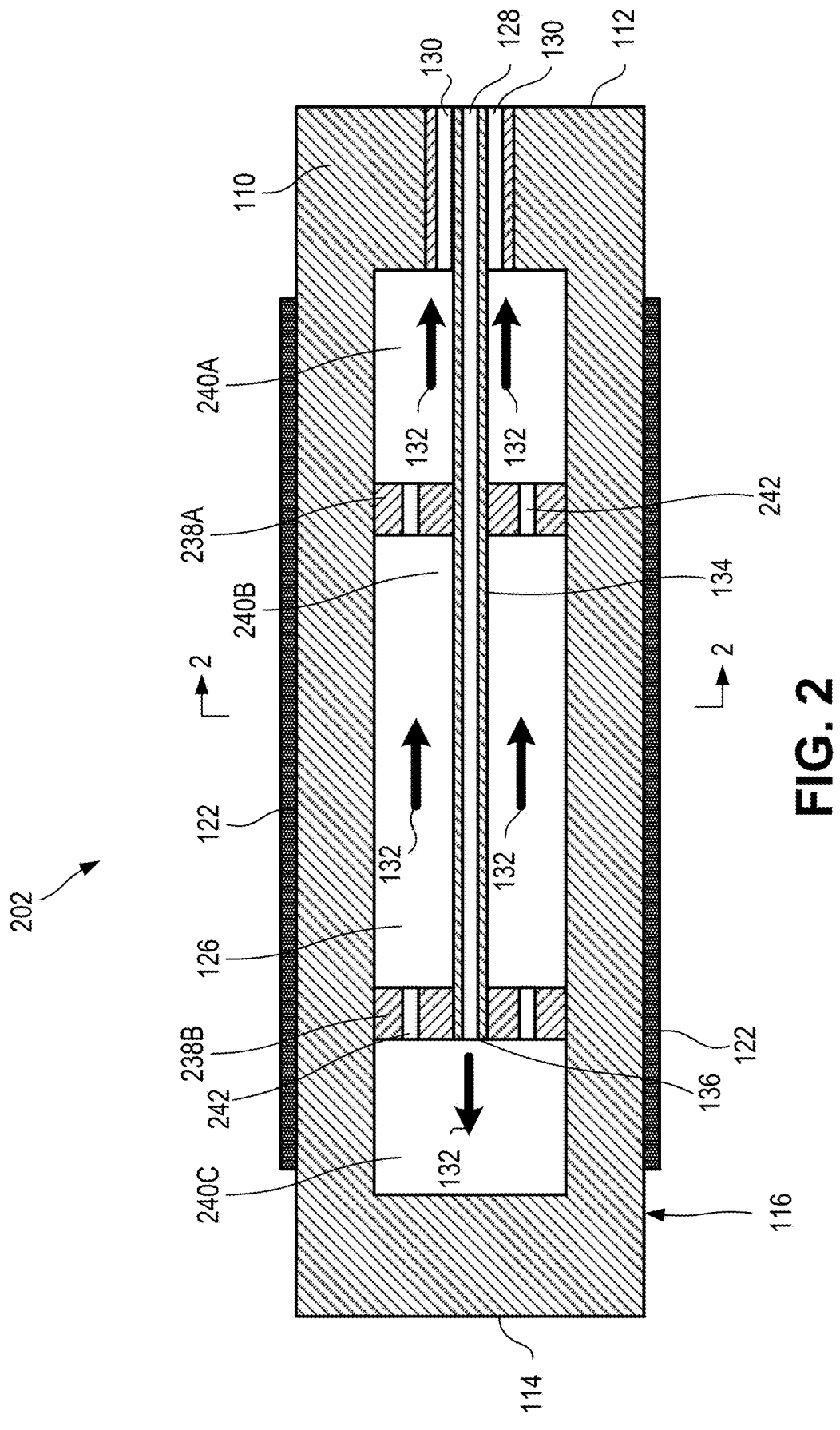
FIG. 2 is a schematic of a magnetic rotor according to embodiments of the disclosure.
Figure 3:
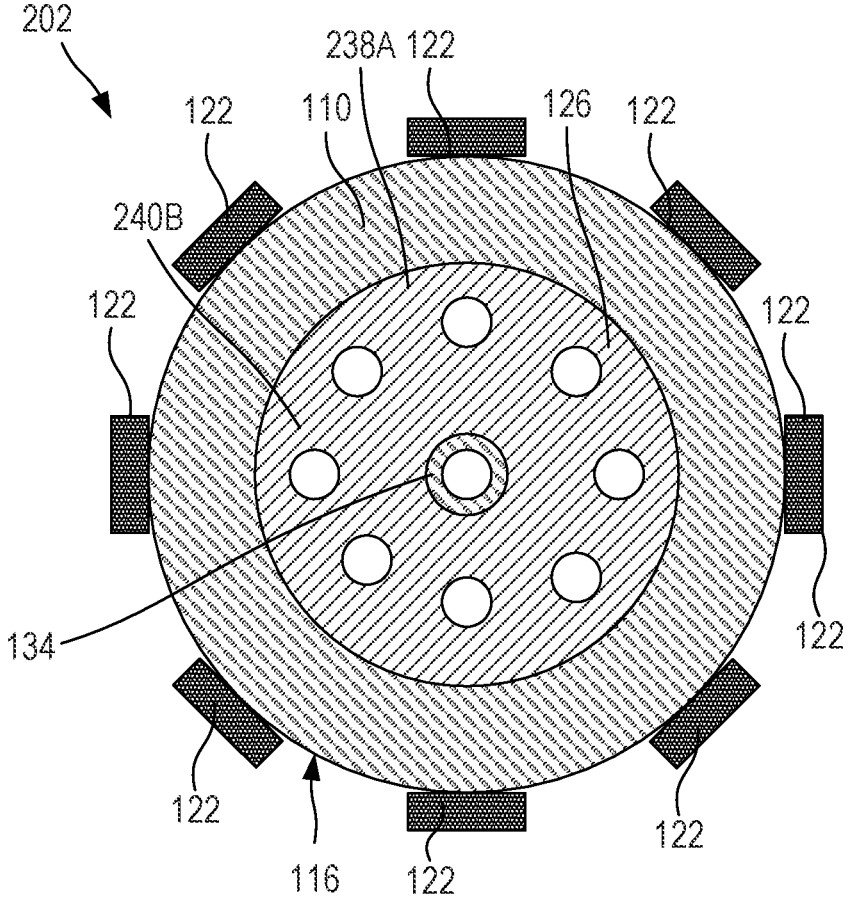
FIG. 3 is a sectional view of the magnetic rotor of FIG. 2 taken along line 2-2 in FIG. 3.

FIGS. 2 and 3 illustrate another example of a magnetic rotor 202 for a magnetic rotor system. The magnetic rotor 202 is substantially similar to the magnetic rotor 102 except that the chamber 126 has a different shape, and the chamber 126 additionally includes at least one insert 238A-B. In the example of FIGS. 2 and 3, the chamber 126 includes two inserts 238A-B. The inserts 238A-B may be formed integrally or monolithically with the rotor body 110 such that the rotor body 110 and inserts 238A-B are a single component, but in other examples, the inserts 238A-B are separate components that are removably or permanently retained within the chamber 126 through various suitable attachment mechanisms.

In some examples, the inserts 238A-B may at least partially support the supply extension 134 within the chamber 126. The inserts 238A-B may subdivide the chamber 126 into sub-chambers 240A-C, it being understood that the number of sub-chambers 240 depends on the number of inserts 238. The size of the sub-chambers may be the same or may be different as desired. The inserts 238A-B may define passages 242 extending through the inserts 238A-B such that the sub-chambers 240 are in fluid communication with each other and such that the inlet 128 is ultimately in fluid communication with the outlet 130. In various aspects, the inserts 238A-B may be included to further control coolant flow rate within the chamber 126 and coolant distribution within the chamber 126. In some examples, the inserts 238A-B may be constructed from the same material used to form the rotor body 110, although they need not be in other examples. In some optional examples, the inserts 238A-B may be constructed from carbon steel or stainless steel such that welding and/or joining can be performed.

Figure 4:
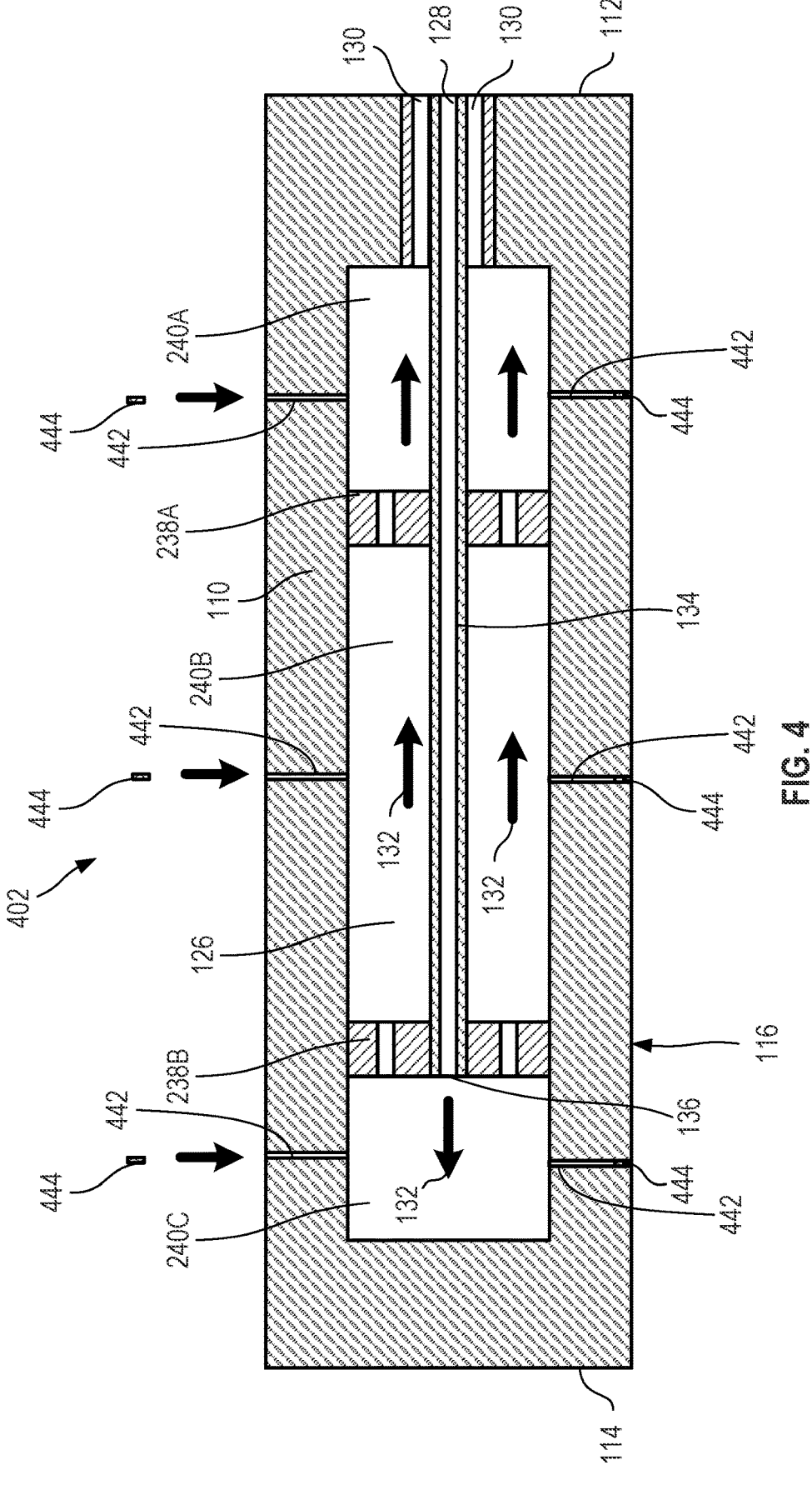
FIG. 4 is a schematic of a magnetic rotor according to embodiments of the disclosure.

FIG. 4 illustrates another example of a magnetic rotor 402 that is substantially similar to the magnetic rotor 202 except that the rotor body 110 further defines at least one relief passage 442 that extends from the chamber 126 to the outer surface 116 of the rotor body 110. In FIG. 4, the magnets supported on the rotor body 110 have been omitted for clarity. In various aspects, the relief passages 442 may allow for venting of the chamber 126 while the chamber 126 is initially filled with the coolant. For example, the relief passages 442 may allow for the venting of air from the chamber 126 as a liquid coolant is supplied into the chamber 126. In various aspects, after the chamber 126 is filled with the coolant, plugs 444 may be positioned within the relief passages 442 to block the relief passages 442.

Figure 5:
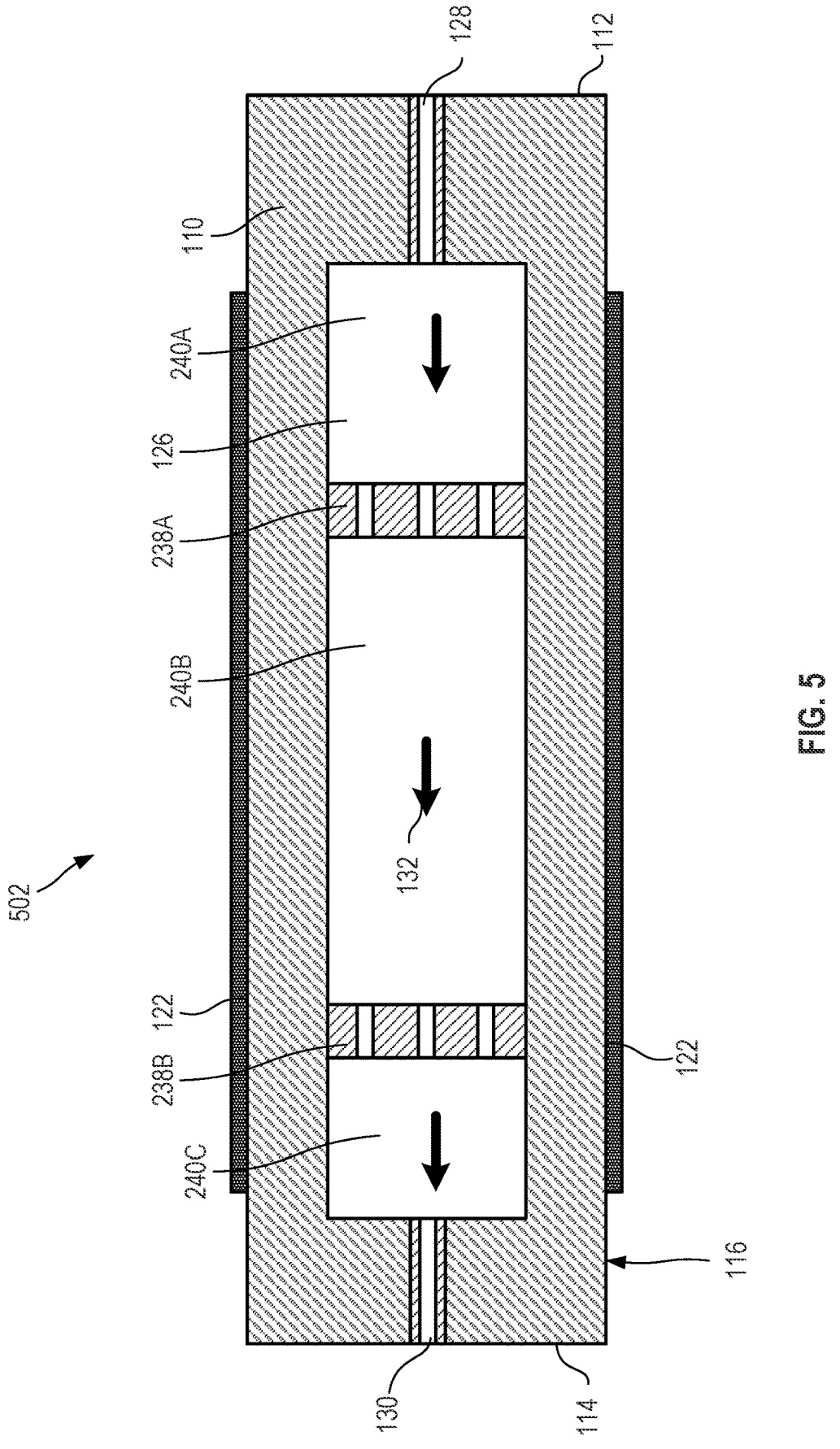
FIG. 5 is a schematic of a magnetic rotor according to embodiments of the disclosure.

FIG. 5 illustrates another example of a magnetic rotor 502 that is substantially similar to the magnetic rotor 202 except that the inlet 128 and the outlet 130 are at different locations. In the example of FIG. 5, the inlet 128 and outlet 130 are at opposing sides of the rotor body 110, although they could be in other locations as desired. In addition, compared to the magnetic rotor 202, the supply extension 134 is omitted from the magnetic rotor 502.

Referring back to FIG. 1, a method of controlling a temperature of at least one magnetic rotor 102 includes providing the magnetic rotor 102 that includes the rotor body 110 having the chamber 126. The method includes supplying the coolant from the coolant supply 104 to the magnetic rotor 102 such that the coolant flows through the chamber 126 from an inlet 128 of the chamber 126 to an outlet 130 of the chamber 126.

In some examples, the method includes providing the coolant such that the coolant has a predetermined characteristic. The predetermined characteristic may include, but is not limited to, a pressure of the coolant, a flow rate of the coolant, a type of coolant, a flow path of the coolant through the chamber 126, and/or a volume of the coolant within the chamber 126.

In certain examples, the method includes detecting at least one characteristic of the magnetic rotor system with a sensor, and controlling the magnetic rotor system with a controller based on the detected at least one characteristic. The detected characteristic may include, but is not limited to, the temperature gradient of the magnetic rotor, the temperature gradient of the coolant within the chamber, the temperature of the coolant exiting the magnetic rotor, the pressure of the coolant, the flow rate of the coolant, and/or the type of coolant. Controlling the magnetic rotor system may include, but is not limited to, the entry and/or exit pressure of the coolant, a temperature of the coolant supplied to the magnetic rotor and/or exiting the magnetic rotor, the flow rate of the coolant, and/or the type of coolant.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A magnetic rotor comprising: a rotor body rotatable about an axis, the rotor body defining a chamber having an inlet and an outlet, wherein the rotor body defines a coolant flow path within the chamber from the inlet to the outlet, and wherein the rotor body is configured to receive a coolant within the chamber; and at least one magnet supported on the rotor body.

Illustration 2. The magnetic rotor of any preceding or subsequent illustrations or combination of illustrations, wherein the inlet and the outlet are at an end of the rotor body.

Illustration 3. The magnetic rotor of any preceding or subsequent illustrations or combination of illustrations, wherein the rotor body comprises a first end and a second end opposite from the first end, wherein the inlet is at the first end and wherein the outlet is at the second end.

Illustration 4. The magnetic rotor of any preceding or subsequent illustrations or combination of illustrations, wherein the rotor body comprises an outer surface, wherein the at least one magnet is supported on the outer surface, and wherein the chamber extends beneath at least a portion of the outer surface.

Illustration 5. The magnetic rotor of any preceding or subsequent illustrations or combination of illustrations, wherein the outer surface is substantially parallel to the axis.

Illustration 6. The magnetic rotor of any preceding or subsequent examples or combination of examples, wherein the at least one magnet comprises a plurality of permanent magnets.

Illustration 7. The magnetic rotor of any preceding or subsequent illustrations or combination of illustrations, further comprising a supply extension within the chamber, wherein the supply extension is in fluid communication with the inlet and is configured to supply the coolant at a predetermined location within the chamber offset from the inlet.

Illustration 8. The magnetic rotor of any preceding or subsequent illustrations or combination of illustrations, wherein the inlet is at the first end of the rotor body, and wherein the predetermined location is more proximate to the second end than the first end within the chamber.

Illustration 9. The magnetic rotor of any preceding or subsequent illustrations or combination of illustrations, further comprising at least one insert within the chamber, and wherein the at least one insert separates the chamber into a first sub-chamber and a second sub-chamber.

Illustration 10. The magnetic rotor of any preceding or subsequent illustrations or combination of illustrations, wherein the rotor body comprises an outer surface, wherein the chamber extends beneath at least a portion of the outer surface, and wherein the rotor body defines at least one relief passage extending from the chamber to the outer surface.

Illustration 11. The magnetic rotor of any preceding or subsequent illustrations or combination of illustrations, further comprising a plug removably positioned in the at least one relief passage.

Illustration 12. A magnetic rotor system comprising: a magnetic rotor comprising: a rotor body rotatable about an axis and defining a chamber; and at least one magnet supported on the rotor body; and a coolant supply in fluid communication with the magnetic rotor such that a coolant is selectively provided into the chamber of the rotor body.

Illustration 13. The magnetic rotor system of any preceding or subsequent illustrations or combination of illustrations, wherein the coolant supply comprises at least one tank, and wherein the at least one tank is at a position vertically above the magnetic rotor.

Illustration 14. The magnetic rotor system of any preceding or subsequent illustrations or combination of illustrations, further comprising: a sensor configured to detect at least one characteristic of the magnetic rotor system; and a controller communicatively coupled to the sensor, wherein the controller is configured to control the magnetic rotor system based on the at least one detected characteristic.

Illustration 15. The magnetic rotor system of any preceding or subsequent illustrations or combination of illustrations, wherein the at least one characteristic comprises at least one of a temperature gradient on the magnetic rotor, a temperature gradient of the coolant within the chamber, a temperature of the coolant entering or exiting the magnetic rotor, a pressure of the coolant entering or exiting the magnetic rotor, or a flow rate of the coolant, and wherein the controller is configured to control at least one of the pressure of the coolant at the entry or exit of the magnetic rotor, a temperature of the coolant entering or exiting the magnetic rotor, or the flow rate of the coolant.

Illustration 16. The magnetic rotor system of any preceding or subsequent illustrations or combination of illustrations, wherein the chamber comprises an inlet and an outlet, wherein the rotor body defines a coolant flow path within the chamber from the inlet to the outlet, and wherein the coolant is provided such that it flows within the chamber from the inlet to the outlet.

Illustration 17. The magnetic rotor system of any preceding or subsequent illustrations or combination of illustrations, wherein the inlet and the outlet are at an end of the rotor body.

Illustration 18. The magnetic rotor system of any preceding or subsequent illustrations or combination of illustrations, wherein the rotor body comprises a first end and a second end opposite from the first end, wherein the inlet is at the first end and wherein the outlet is at the second end.

Illustration 19. The magnetic rotor system of any preceding or subsequent illustrations or combination of illustrations, wherein the magnetic rotor further comprises a supply extension within the chamber, wherein the supply extension is in fluid communication with the inlet and is configured to supply the coolant at a predetermined location within the chamber offset from the inlet.

Illustration 20. The magnetic rotor system of any preceding or subsequent illustrations or combination of illustrations, wherein the inlet is at the first end of the rotor body, and wherein the predetermined location is more proximate to the second end than the first end within the chamber.

Illustration 21. The magnetic rotor system of any preceding or subsequent illustrations or combination of illustrations, wherein the rotor body comprises an outer surface, wherein the at least one magnet is supported on the outer surface, and wherein the chamber extends beneath at least a portion of the outer surface.

Illustration 22. The magnetic rotor system of any preceding or subsequent illustrations or combination of illustrations, wherein the outer surface is substantially parallel to the axis.

Illustration 23. The magnetic rotor system of any preceding or subsequent illustrations or combination of illustrations, wherein the at least one magnet comprises a plurality of permanent magnets.

Illustration 24. The magnetic rotor system of any preceding or subsequent illustrations or combination of illustrations, further comprising at least one insert within the chamber, and wherein the at least one insert separates the chamber into a first sub-chamber and a second sub-chamber.

Illustration 25. The magnetic rotor system of any preceding or subsequent illustrations or combination of illustrations, wherein the rotor body comprises an outer surface, wherein the chamber extends beneath at least a portion of the outer surface, and wherein the rotor body defines at least one relief passage extending from the chamber to the outer surface.

Illustration 26. The magnetic rotor system of any preceding or subsequent illustrations or combination of illustrations, further comprising a plug removably positioned in the at least one relief passage.

Illustration 27. A magnetic rotor comprising: a rotor body rotatable about an axis and defining a chamber configured to receive a coolant within the chamber; and at least one magnet supported on the rotor body.

Illustration 28. The magnetic rotor of any preceding or subsequent illustrations or combination of illustrations, wherein the chamber comprises an inlet and an outlet, and wherein the rotor body defines a coolant flow path for the coolant within the chamber from the inlet to the outlet.

Illustration 29. The magnetic rotor of any preceding or subsequent illustrations or combination of illustrations, wherein the inlet and the outlet are at an end of the rotor body.

Illustration 30. The magnetic rotor of any preceding or subsequent illustrations or combination of illustrations, wherein the rotor body comprises a first end and a second end opposite from the first end, wherein the inlet is at the first end and wherein the outlet is at the second end.

Illustration 31. The magnetic rotor of any preceding or subsequent illustrations or combination of illustrations, further comprising a supply extension within the chamber, wherein the supply extension is in fluid communication with the inlet and is configured to supply the coolant at a predetermined location within the chamber offset from the inlet.

Illustration 32. The magnetic rotor of any preceding or subsequent illustrations or combination of illustrations, wherein the inlet is at the first end, and wherein the predetermined location is more proximate to the second end than the first end within the chamber.

Illustration 33. The magnetic rotor of any preceding or subsequent illustrations or combination of illustrations, wherein the rotor body comprises an outer surface, wherein the at least one magnet is supported on the outer surface, and wherein the chamber extends beneath at least a portion of the outer surface.

Illustration 34. The magnetic rotor of any preceding or subsequent illustrations or combination of illustrations, wherein the outer surface is substantially parallel to the axis.

Illustration 35. The magnetic rotor of any preceding or subsequent illustrations or combination of illustrations, wherein the at least one magnet comprises a plurality of permanent magnets.

Illustration 36. The magnetic rotor of any preceding or subsequent illustrations or combination of illustrations, further comprising at least one insert within the chamber, and wherein the at least one insert separates the chamber into a first sub-chamber and a second sub-chamber.

Illustration 37. The magnetic rotor of any preceding or subsequent illustrations or combination of illustrations, wherein the rotor body comprises an outer surface, wherein the chamber extends beneath at least a portion of the outer surface, and wherein the rotor body defines at least one relief passage extending from the chamber to the outer surface.

Illustration 38. The magnetic rotor of any preceding or subsequent illustrations or combination of illustrations, further comprising a plug removably positioned in the at least one relief passage.

Illustration 39. A magnetic rotor comprising: a rotor body comprising an outer surface, wherein the rotor body defines a chamber configured to receive a coolant within the chamber, and wherein the chamber extends beneath at least a portion of the outer surface; and at least one magnet supported on the outer surface of the rotor body.

Illustration 40. A method of controlling a temperature of a magnetic rotor of a magnetic rotor system, the method comprising: providing a magnetic rotor comprising a rotor body and at least one magnet supported on the rotor body, wherein the rotor body defines a chamber having an inlet and an outlet; and supplying a coolant to the magnetic rotor such that the coolant flows through the chamber from the inlet to the outlet.

Illustration 41. The method of any preceding or subsequent illustrations or combination of illustrations, further comprising: detecting at least one characteristic of the magnetic rotor system with a sensor; and controlling the magnetic rotor system with a controller based on the detected at least one characteristic.

Illustration 42. The method of any preceding or subsequent illustrations or combination of illustrations, wherein the at least one characteristic comprises at least one of a temperature gradient on the magnetic rotor, a temperature gradient of the coolant within the chamber, a temperature of the coolant entering or exiting the magnetic rotor, a pressure of the coolant entering or exiting the magnetic rotor, or a flow rate of the coolant, and wherein controlling the magnetic rotor system comprises controlling at least one of the pressure of the coolant at the entry or exit of the magnetic rotor, a temperature of the coolant entering or exiting the magnetic rotor, or the flow rate of the coolant.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A heating system for a metal strip, the heating system comprising:

a magnetic rotor comprising:
a rotor body rotatable about an axis of rotation and defining a chamber, the chamber having an inlet and an outlet, wherein the rotor body defines a coolant flow path within the chamber from the inlet to the outlet, and wherein the rotor body is configured to receive a coolant within the chamber; and
at least one magnet supported on an outer surface of the rotor body, wherein the magnetic rotor is positioned adjacent a pass line of the metal strip moving in a processing direction and is configured to heat the metal strip moving in the processing direction, wherein the axis of rotation of the rotor body is perpendicular to the processing direction;

a coolant supply in fluid communication with the magnetic rotor such that the coolant is selectively provided into the chamber of the rotor body;

a sensor configured to detect at least one characteristic of the magnetic rotor system, wherein the at least one characteristic comprises at least one of a temperature gradient of the magnetic rotor or a temperature gradient of the coolant within the chamber; and a controller communicatively coupled to the sensor, wherein the controller is configured to control the magnetic rotor system based on the at least one characteristic detected by the sensor by controlling at least one of the pressure of the coolant exiting the magnetic rotor, the pressure of the coolant entering the magnetic rotor, the temperature of the coolant entering the magnetic rotor, the temperature of the coolant exiting the magnetic rotor, or the flow rate of the coolant through the chamber.

2. The heating system of claim 1, wherein the coolant supply comprises at least one tank, and wherein the at least one tank is at a position vertically above the magnetic rotor.

3. The heating system of claim 1, wherein the magnetic rotor further comprises a supply extension within the chamber, wherein the supply extension is in fluid communication with the inlet and is configured to supply the coolant at a predetermined location within the chamber offset from the inlet.

4. The heating system of claim 1, wherein the chamber extends beneath at least a portion of the outer surface.

5. A heating system for a metal processing system, the heating system comprising:

a magnetic rotor comprising:
a rotor body rotatable about an axis of rotation, the rotor body defining an internal chamber configured to receive a coolant within the internal chamber; and at least one magnet supported on an outer surface of the rotor body;

a sensor configured to detect at least one characteristic of the magnetic rotor system, wherein the at least one characteristic comprises at least one of a temperature gradient of the magnetic rotor or a temperature gradient of the coolant within the chamber; and a controller communicatively coupled to the sensor, wherein the controller is configured to control the magnetic rotor system based on the at least one characteristic detected by the sensor by controlling at least one of the pressure of the coolant exiting the magnetic rotor, the pressure of the coolant entering the magnetic rotor, the temperature of the coolant entering the magnetic rotor, the temperature of the coolant exiting the magnetic rotor, or the flow rate of the coolant through the chamber;

wherein the magnetic rotor is positioned adjacent a pass line of a metal strip moving in a processing direction through the heating system and such that the magnetic rotor is configured to heat the metal strip moving in the processing direction through the heating system, and wherein the axis of rotation of the rotor body is perpendicular to the processing direction.

6. The heating system of claim 5, wherein the internal chamber comprises an inlet and an outlet, and wherein the rotor body defines a coolant flow path for the coolant within the internal chamber from the inlet to the outlet.

7. The heating system of claim 6, further comprising a supply extension within the chamber, wherein the supply extension is in fluid communication with the inlet and is configured to supply the coolant at a predetermined location within the internal chamber offset from the inlet.

8. The heating system of claim 5, wherein the supply extension is terminable at various intermediate locations within the internal chamber and inserts are separate components that are removably retained within the chamber and configured to support the supply extension within the chamber.

9. The heating system of claim 5, wherein the at least one magnet comprises a plurality of permanent magnets.

10. The heating system of claim 5, further comprising at least one insert within the internal chamber, and wherein the at least one insert separates the internal chamber into a first sub-chamber and a second sub-chamber.

* * * * *